United States Patent
Venkatraman et al.

(10) Patent No.: US 9,313,767 B2
(45) Date of Patent: Apr. 12, 2016

(54) USING BROADCAST POSITION AND TRANSMIT POWER FROM ACCESS POINTS TO FORM ASSISTANCE DATA

(71) Applicant: QUALCOMM Incorporated, San Diego, CA (US)

(72) Inventors: Sai Pradeep Venkatraman, Santa Clara, CA (US); Weihua Gao, San Jose, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 14/096,853

(22) Filed: Dec. 4, 2013

(65) Prior Publication Data

US 2015/0080013 A1    Mar. 19, 2015

Related U.S. Application Data

(60) Provisional application No. 61/880,077, filed on Sep. 19, 2013.

(51) Int. Cl.
*H04W 64/00* (2009.01)
*G01S 5/02* (2010.01)
*H04W 24/08* (2009.01)

(52) U.S. Cl.
CPC ........... *H04W 64/003* (2013.01); *G01S 5/0236* (2013.01); *G01S 5/0252* (2013.01); *H04W 24/08* (2013.01)

(58) Field of Classification Search
CPC .................................................. H04W 64/003
USPC ..................... 455/456.1, 550.1; 370/328, 338
See application file for complete search history.

(56) References Cited

U.S. PATENT DOCUMENTS

| | | | |
|---|---|---|---|
| 8,370,629 B1 | 2/2013 | Ngo et al. | |
| 9,107,045 B2* | 8/2015 | Zhou | H04W 4/043 |
| 9,121,922 B2* | 9/2015 | Jarvis | G01S 5/02 |
| 9,194,933 B2* | 11/2015 | Tidd | G01S 5/0242 |
| 2011/0090123 A1 | 4/2011 | Sridhara et al. | |
| 2012/0184292 A1 | 7/2012 | Lin et al. | |
| 2012/0188938 A1 | 7/2012 | Venkatraman et al. | |
| 2012/0196644 A1 | 8/2012 | Scherzer et al. | |
| 2012/0302263 A1 | 11/2012 | Tinnakornsrisuphap et al. | |
| 2013/0110454 A1 | 5/2013 | Sidhu et al. | |
| 2014/0206379 A1* | 7/2014 | Mayor | H04W 64/003 455/456.1 |

OTHER PUBLICATIONS

International Search Report and Written Opinion—PCT/US2014/051551—ISA/EPO—Feb. 24, 2015.

* cited by examiner

*Primary Examiner* — David Q Nguyen
(74) *Attorney, Agent, or Firm* — Silicon Valley Patent Group LLP

(57) ABSTRACT

Systems, apparatus and methods for preparing assistance data in a location server from coverage report messages of one or more access points from a plurality of mobile devices are presented. Several mobile devices each collect information from and about one or more access points. This crowd-sourced information is sent from a mobile device to a location server and may include ranging information (such as RSSI or RTT) and/or broadcast information (such as broadcast position and/or transmit power level) and/or computed information (such as path loss). Using this crowd-sourced information, the location server may form assistance data for an assistance data database, which may later be tailored for and send to a specific mobile device.

24 Claims, 13 Drawing Sheets

Forming assistance data
based on coverage reports
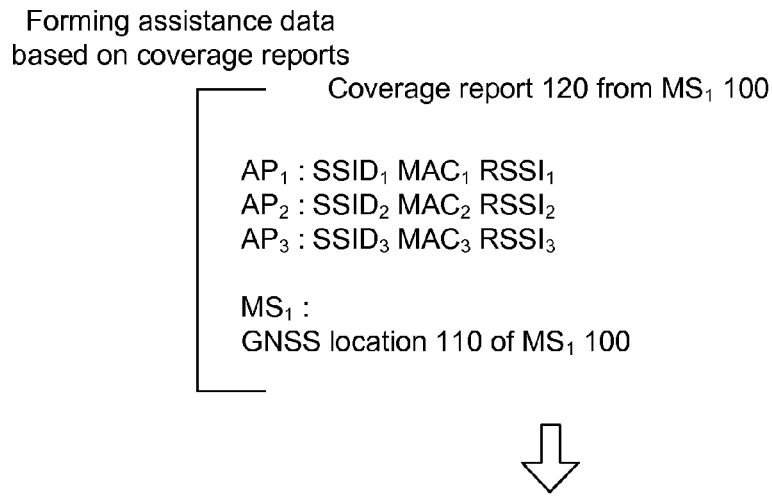
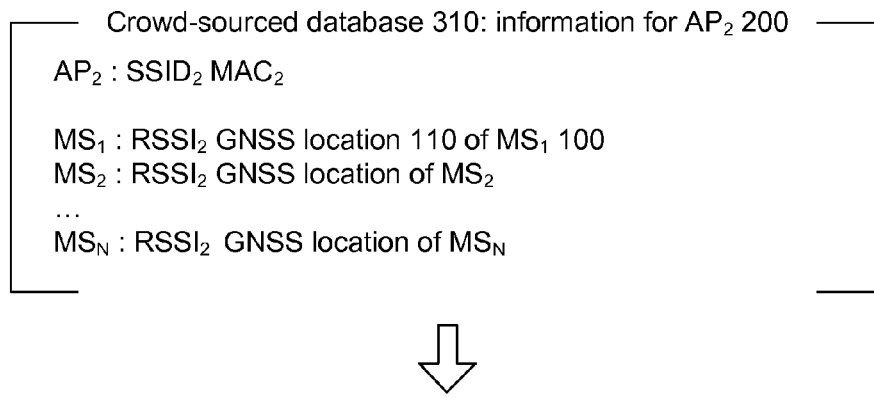
Compute crowd-sourced position 210 of $AP_2$ 200 from crowd-sourced database 310 information for $AP_2$ 200;
Determine position 230 from crowd-sourced position 210
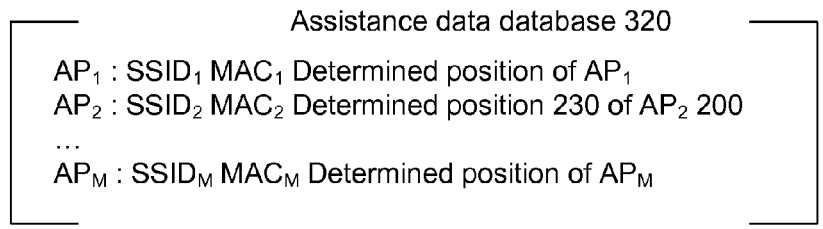
Mobile device 100
FIG. 4

| AP$_1$ beacon broadcast | SSID$_1$ | MAC$_1$ |

| AP$_2$ beacon broadcast | SSID$_2$ | MAC$_2$ |

| AP$_3$ beacon broadcast | SSID$_3$ | MAC$_3$ |

| AP$_4$ beacon broadcast | SSID$_4$ | MAC$_4$ |

| AP$_5$ beacon broadcast | SSID$_5$ | MAC$_5$ |

FIG. 5

| AP$_1$ beacon broadcast | SSID$_1$ | MAC$_1$ | | |

| AP$_2$ beacon broadcast | SSID$_2$ | MAC$_2$ | Broadcast location 220 | (valid) |

| AP$_3$ beacon broadcast | SSID$_3$ | MAC$_3$ | Transmit power level | |

| AP$_4$ beacon broadcast | SSID$_4$ | MAC$_4$ | Broadcast location | Transmit power level |

| AP$_5$ beacon broadcast | SSID$_5$ | MAC$_5$ | Broadcast location | (invalid) |

FIG. 6

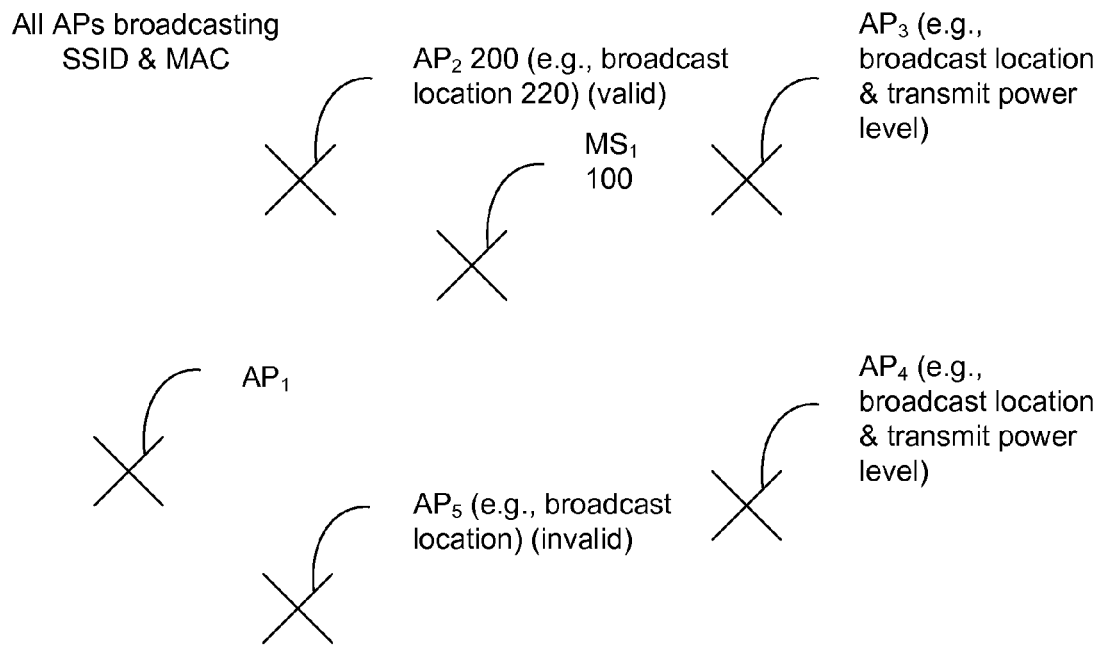
FIG. 7
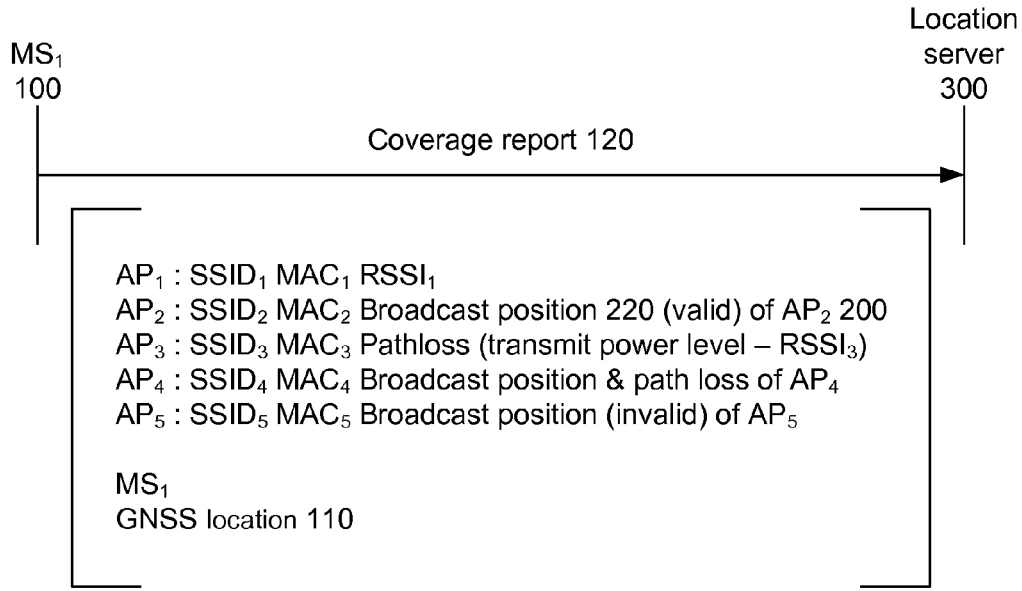
FIG. 8
$AP_M$ : $SSID_M$ + $MAC_M$
   + (($RSSI_M$ and/or $RTT_M$)
       and/or (Broadcast position)
       and/or (Broadcast transmit power level and/or path loss))
FIG. 9

USING BROADCAST POSITION AND TRANSMIT POWER FROM ACCESS POINTS TO FORM ASSISTANCE DATA

CROSS-REFERENCE TO RELATED APPLICATIONS

This application claims the benefit of and priority under 35 U.S.C. §119(e) to U.S. Provisional Application No. 61/880,077, filed Sep. 19, 2013, and entitled "Using broadcast position and transmit power from access points to form assistance data," which is incorporated herein by reference in its entirety.

BACKGROUND

I. Field of the Invention

This disclosure relates generally to systems, apparatus and methods for generating valid assistance data, and more particularly to utilizing both a crowd-sourced position and a broadcast position of an access point and/or a transmit power level broadcast by the access point to improve a position of the access point in assistance data.

II. Background

Assistance data does not include a variable position of an access point but instead a static position of the access point. That is, each time the assistance data is sent to a mobile device, the same fixed position is used as the position of the access point. Crowd-sourced information from a plurality of mobile devices is not used to compute and improve a position of an access point. In fact, a broadcast position broadcasted by the access point itself is not sanity checked or altered by crowd-sourced information. Furthermore, a transmit power level broadcast by an access point is not used to improve a position of an access point. What is needed is a means to improve a position in an assistance data database of an access point based on a broadcast position of an access point, a broadcast transmit level of the access point, a path loss between the access point and a plurality of mobile devices, and GNSS locations of the plurality of mobile devices.

BRIEF SUMMARY

Disclosed are systems, apparatus and methods for preparing assistance data.

According to some aspects, disclosed is a method in a location server for preparing assistance data, the method comprising: computing a crowd-sourced position from a crowd-sourced database for an access point; determining that the access point is broadcasting a broadcast position of the access point; setting a position of the access point based on information of the crowd-sourced position and the broadcast position; saving the position of the access point to an assistance data database.

According to some aspects, disclosed is a location server for preparing assistance data, the location server comprising: a crowd-sourced database containing a plurality of mobile device reports for a plurality of access points, wherein each mobile device report from the plurality of mobile device reports contains a location of a mobile device and an identifier of an access point; an assistance data database containing a position of each of the plurality of access points; and a processor coupled to the crowd-sourced database and the assistance data database, and configured to: compute a crowd-sourced position from the crowd-sourced database for each access point; determine that the access point is broadcasting a broadcast position of the access point; set the position of the access point based on information of the crowd-sourced position and the broadcast position; save the position of the access point to the assistance data database.

According to some aspects, disclosed is a location server for preparing assistance data, the location server comprising: means for computing a crowd-sourced position from a crowd-sourced database for an access point; means for determining that the access point is broadcasting a broadcast position of the access point; means for setting a position of the access point based on information of the crowd-sourced position and the broadcast position; means for saving the position of the access point to an assistance data database.

According to some aspects, disclosed is a non-transitory computer-readable storage medium for preparing assistance data in a location server, the non-transitory computer-readable storage medium including program code stored thereon, comprising program code to: compute a crowd-sourced position from a crowd-sourced database for an access point; determine that the access point is broadcasting a broadcast position of the access point; set a position of the access point based on the crowd-sourced position and the broadcast position; save the position of the access point to an assistance data database.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

FIG. 4 shows a process of converting a coverage report message for forming an assistance data database, in accordance with some embodiments of the present invention.

FIG. 5 shows broadcasts from a plurality of access points.

FIG. 6 shows broadcasts from a plurality of access points, in accordance with some embodiments of the present invention.

FIG. 7 shows an example of a mobile device among access points, in accordance with some embodiments of the present invention.

FIG. 8 shows example contents of a coverage report message, in accordance with some embodiments of the present invention.

FIG. 9 shows information elements contained in a coverage report message for a single access point, in accordance with some embodiments of the present invention.

DETAILED DESCRIPTION

Figure 1:
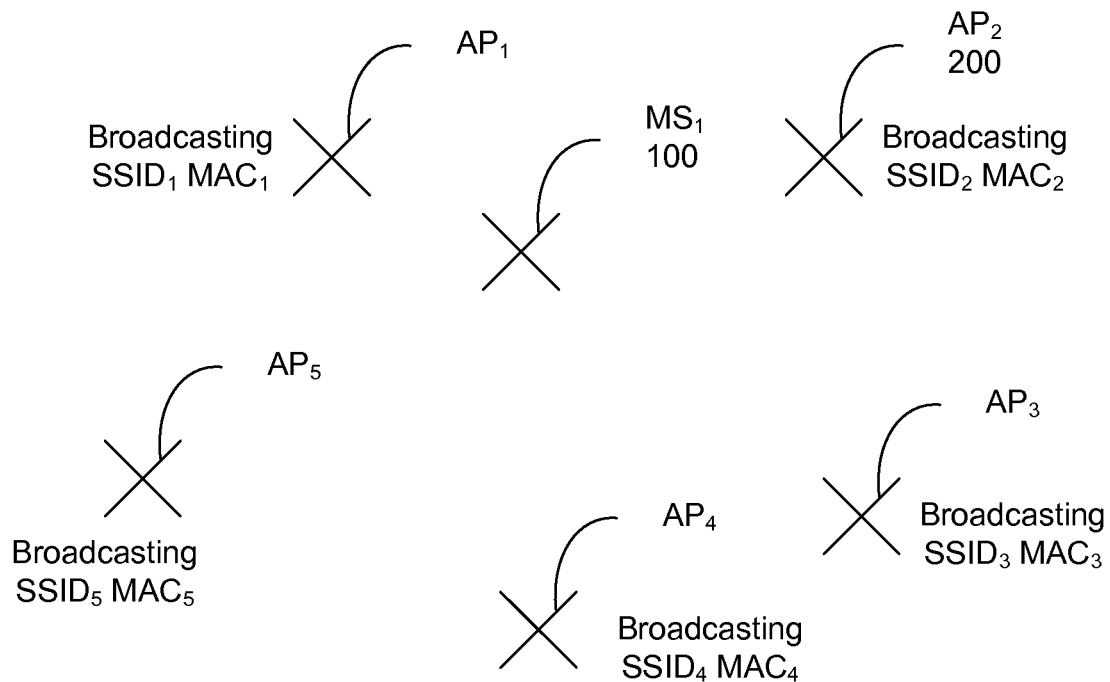
FIG. 1 shows an example of a mobile device among access points.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Location and position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters locationed to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or location-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or location-related processing occurs at the device, at a server, or at another device associated with the network. Any operable combination of the above are also considered a "mobile device."

FIG. 1 shows an example of a mobile device 100 among access points 200. The mobile device 100 (also referred to as MS 100 or $MS_1$ 100) "sees" several access points 200 (also referred to as $AP_1$, $AP_2$, $AP_3$, $AP_4$, $AP_5$ and $AP_2$ 200). Each access point 200 broadcast its SSID (service set identification shown as $SSID_1$, $SSID_2$, $SSID_3$, $SSID_4$ and $SSID_5$) and its MAC address (media access control address shown as $MAC_1$, $MAC_2$, $MAC_3$, $MAC_4$ and $MAC_5$). An SSID is a network name, which is commonly a human-readable text string. A MAC address is a unique identifier assigned to an access point 200. The mobile device 100 may send a coverage report message 120 to a location server 300 reporting what access points 200 the mobile device 100 receives.

Figure 2:
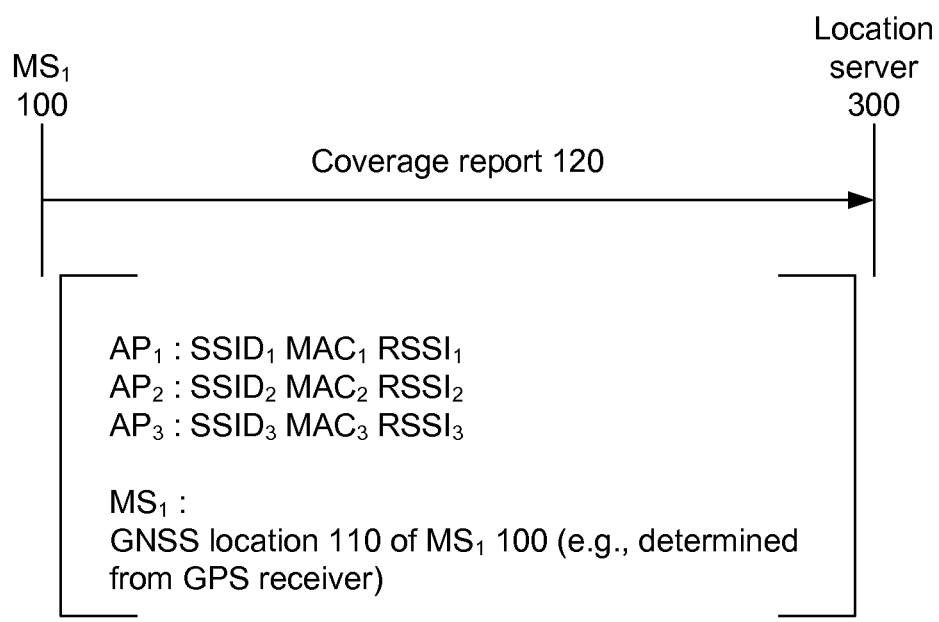
FIG. 2 shows example contents of a coverage report message, in accordance with some embodiments of the present invention.

FIG. 2 shows example contents of a coverage report message 120, in accordance with some embodiments of the present invention. The coverage report message 120 is transmitted by the mobile device 100 to a location server 300 through an access point 200 or a cellular base station. The coverage report message 120 contains, for each access point with a receivable signal, an SSID and/or a MAC address. The coverage report message 120 may also contain ranging information such as RSSI (received signal strength indication) and/or RTT (round-trip time measurements) of WLAN packets sent between an access point 200 and the mobile device 100. The coverage report message 120 also contains information about the mobile device 100 such as a GNSS location 110 (Global Navigation Satellite System location), for example, as determined by a GPS receiver (Global Positioning System receiver).

Figure 3:
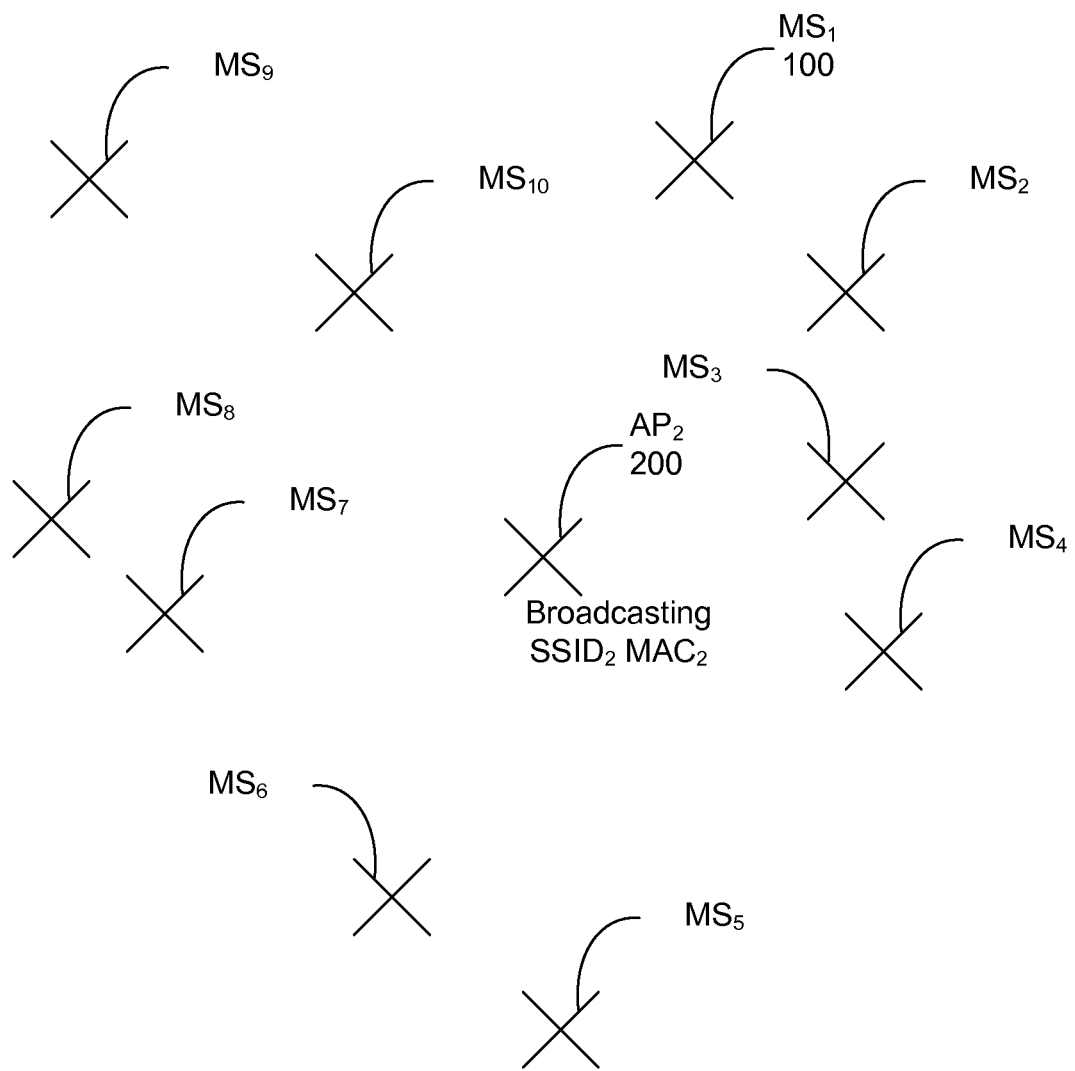
FIG. 3 shows a plurality of mobile devices receiving a signal from a single access point.

FIG. 3 shows a plurality of mobile devices 100 receiving a signal from a single access point 200. A location server 300 may determine which mobile devices 100 have received a signal from a particular access point 200 (e.g., $AP_2$ 200) from a large sampling of coverage report message 120. In the example shown, ten mobile devices 100 ($MS_1$ 100, $MS_2$, $MS_3$, $MS_4$, $MS_5$, $MS_6$, $MS_7$, $MS_8$, $MS_9$ and $MS_{10}$) have recently sent a coverage report message 120 indicating $AP_2$ 200 is broadcasting an $SSID_2$ and a MAC address ($MAC_2$). Based on the various reported GNSS locations 110 of the mobile devices 100, a location server 300 may determine a position 230 of the access point 200 ($AP_2$ 200). The determined position 230 may be aggregated with similarly determined positions 230 to form assistance data 322 for a mobile device 100.

FIG. 4 shows a process of converting a coverage report message 120 for forming an assistance data database 320, in accordance with some embodiments of the present invention. The process occurs in a location server 300. The coverage report message 120 is received at the location server 300 from a plurality of mobile devices 100. The location server 300 reorganizes the coverage report messages 120 based on individual access points 200, rather than by mobile devices 100, in a crowd-sourced database 310. For each access point 200 (e.g., $AP_2$ 200) from one to N, the crowd-sourced database 310 contains an SSID and/or a MAC address (e.g., $SSID_2$ and $MAC_2$). The crowd-sourced database 310 also contains an entry for each mobile device 100 that sent a coverage report messages 120 within a period of time. For example, the entry for each mobile device 100 may contain ranging information such as RTT and/or RSSI (e.g., $RSSI_1$, $RSSI_2$, ..., $RSSI_N$) and a GNSS location 110.

Next, the location server 300 computes a crowd-sourced position 210 for each individual access point 200 from the crowd-sourced database 310. The location server 300 may use one of several ways to compute the crowd-sourced position 210 for an access point 200 depending on accuracy desired and information available in the crowd-sourced database 310. The location server 300 may average together the GNSS locations 110 of each mobile device 100. The location server 300 may weigh the GNSS locations 110 of each mobile device 100 by an inverse of the received ranging information. For example:

$$\text{crowd-sourced location} = \prod_{i=1}^{N} \frac{1}{RSSI_i} \cdot (GNSS \text{ position}).$$

Prior to computing a crowd-sourced position 210, the location server 300 may remove any outliers, such as mobile device(s) 100 having the largest ranging information (e.g., RTT>threshold).

Next, the location server 300 determines a position 230 from the crowd-sourced position 210. For example, the location server 300 may simply use the crowd-sourced position 210 as the determined position 230. Alternatively, the location server 300 may combine or average the crowd-sourced position 210 with a believed position (e.g., from a list of access points). Alternatively, the location server 300 may use the crowd-sourced position 210 as the determined position 230 when the distance between the crowd-sourced position 210 and a believed position is greater than a threshold and when the distance between the positions is less than a threshold.

Finally, the location server 300 saves the determined positions 230 to an assistance data database 320. The assistance data database 320 contains the SSID and/or the MAC address along with the determined position 230 for each access point 200. Later, when the assistance data database 320 is used to prepare assistance data 322, the location server 300 reads information from selected access points 200. Information in the coverage report message 120, the crowd-sourced database 310, the assistance data database 320 and/or the assistance data 322 may contain just the MAC address without the SSID. Alternatively, the messages and databases may include both the MAC address and the SSID.

FIG. 5 shows broadcasts from a plurality of access points 200. Each access point may broadcast a beacon signal containing an SSID and a MAC address. As shown, first, second, third, fourth and fifth access points 200 ($AP_1$, $AP_2$, $AP_3$, $AP_4$ and $AP_5$) each broadcast an SSID and a MAC address ($SSID_1$/$MAC_1$, $SSID_2$/$MAC_2$, $SSID_3$/$MAC_3$, $SSID_4$/$MAC_4$, $SSID_5$/$MAC_5$, respectively).

FIG. 6 shows broadcasts from a plurality of access points 200, in accordance with some embodiments of the present invention. In addition to broadcasting an SSID and a MAC address, an access point 200 may broadcast a position 220, a transmit power level, or both. The broadcast position 220 may be highly accurate, somewhat accurate or arbitrary. For example, an installer of an access point 200 may conduct a survey at the point of an access point antenna with a highly accurate GPS surveying tool. The new access point 200 then broadcasts the highly accurate broadcast position 220. The installer may use a GPS location with a large uncertainty and/or a point distant from the access point antenna site. Broadcast of this location as broadcast position 220 may be considered somewhat accurate. Alternatively, the installer may erroneously enter a GPS location into the access point 200 or the access point 200 may be broadcasting a factory default position as broadcast position 220.

A network of access points 200 may broadcast similar information or various combinations of information as shown. In this example used in FIGS. 6-8 and 10, each of the access points 200, including a first access point ($AP_1$), broadcasts its SSID and its MAC address. The second access point 200 ($AP_2$) also broadcasts its position 220, which happens to be a valid position that is highly accurate to somewhat accurate. The third access point 200 ($AP_3$) also broadcasts its transmit power level. The transmit power level indicates an output power level at a transmitter in the access point 200. The forth access point 200 ($AP_4$) broadcasts both its position 220 and its transmit power level. The fifth access point 200 ($AP_5$) also broadcasts its position 220, which happens to be an invalid position that is unset, un-calibrated, a factory default, erroneous and/or arbitrary. The invalid position may be more than a threshold distance away from its actual position. For example, the invalid position may be a block or more away from the antenna(s) of the access point 200.

FIG. 7 shows an example of a mobile device 100 among access points 200, in accordance with some embodiments of the present invention. A mobile device 100 ($MS_1$ 100) "sees"

or receives signals from a plurality of access points 200 (AP$_1$, AP$_2$, AP$_3$, AP$_4$ and AP$_5$). Each access point 200 broadcasts it configured SSID and its unique MAC address and possible its position 230 and possible its transmit power level. Namely, each access point in the example broadcasts a signal as outlined in FIG. 6.

FIG. 8 shows example contents of a coverage report message 120, in accordance with some embodiments of the present invention. The coverage report message 120 includes a MAC address and/or its SSID for each received access point 200. The coverage report message 120 may also contain other information elements such as a broadcast position 220 and/or a broadcast transmit power level for an access point 200. The broadcast position 220 may be valid or invalid as described above. The coverage report message 120 may also contain a path loss and/or ranging information such as an RTT or RSSI value between an access point and a mobile device 100. The coverage report message 120 also contains a GNSS location 110 of the mobile device 100.

In this example, the coverage report message 120 includes various possible combinations of information elements: an SSID1, a MAC address (MAC1) and an RSSI1 value for the first access point 200 (AP1); an SSID2, a MAC address (MAC2), a valid broadcast position 220 and an RSSI2 value for the second access point 200 (AP2); an SSID3, a MAC address (MAC3) and a path loss value for the third access point 200 (AP3); an SSID4, a MAC address (MAC4), a broadcast position 220 and a path loss value for the fourth access point 200 (AP4); and an SSID5, a MAC address (MAC5), an invalid broadcast position 220.

FIG. 9 shows information elements contained in a coverage report message 120 for a single access point 200, in accordance with some embodiments of the present invention. Formulaically, the coverage report message 120 containing a generic access point (AP$_M$) and generally may contain (an SSID$_M$ and/or a MAC address (MAC$_M$)) and perhaps ranging information and/or a broadcast position 220 and/or a broadcast transmit power level and/or path loss. At a minimum, the coverage report message 120 for a particular access point 200 contains a MAC address or equivalent address to uniquely identify an access point 200. If the access point 200 also broadcasts a transmit power level, the coverage report message 120 for the particular access point 200 may contain a path loss or other indicator of distance, such as a number of meters from an access point 200.

Figure 10:
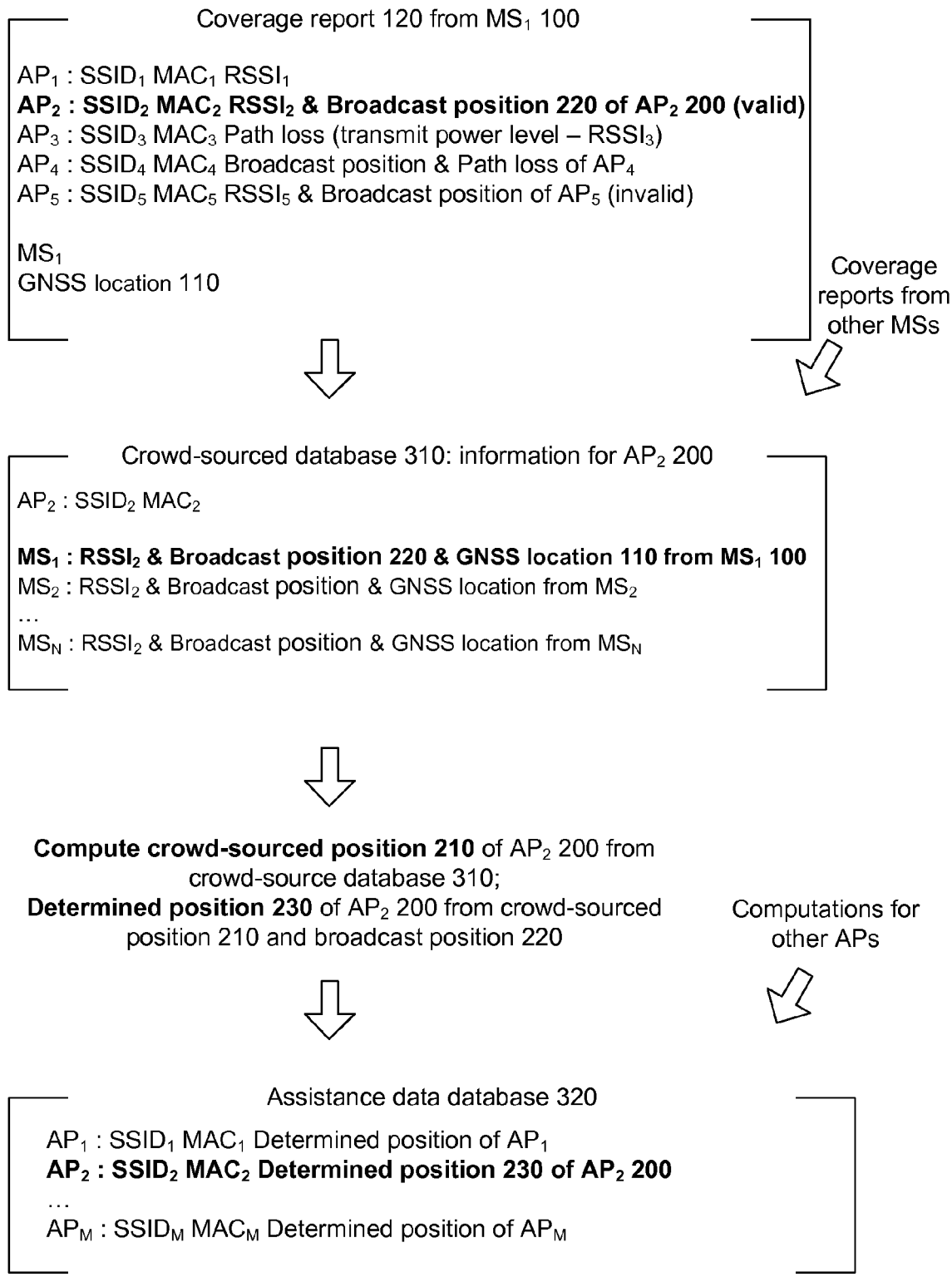
FIG. 10 shows a process of converting coverage report message for an assistance data database, in accordance with some embodiments of the present invention.

FIG. 10 shows a process of converting coverage report message 120 for an assistance data database 320, in accordance with some embodiments of the present invention. The process occurs in a location server 300. The coverage report message 120 is received at the location server 300 from a plurality of mobile devices 100 and saved to a crowd-sourced database 310.

First, the location server 300 reorganizes the coverage report messages 120 to form the crowd-sourced database 310. The location server 300 groups together information for common access points 200. For example, one access point 200 will be contained in several coverage report message 120 from the same or different mobile devices 100. Each coverage report messages 120 containing an entry for the common access point 200 is grouped together. In the example shown, a record for the common access point 200 (e.g., AP$_2$ 200) contains a unique identifier such as the SIDD$_2$ and MAC address (MAC$_2$) for the common access point 200. The record also contains information received separately from MS$_1$, MS$_2$, . . . and MS$_N$. The line for MS$_1$ contains RSSI$_2$ for AP$_2$ as received at MS$_1$, a broadcast position 220 for AP$_2$ received at MS$_1$, and a GNSS location 110 of MS$_1$. Depending if a broadcast mode of AP$_2$ was consistent or changed midway through receiving coverage report messages 120, the lines for each mobile device 100 may be similar or different. In the example shown, MS$_2$ through MS$_N$ have similar coverage report messages 120.

Again as described above with reference to FIG. 4, the location server 300 computes a crowd-sourced position 210 from the crowd-sourced database 310 for each individual access point 200. The location server 300 may use one of several ways to compute the crowd-sourced position 210 as described above. Next, the location server 300 determines a position 230 from the crowd-sourced position 210. Finally, the location server 300 saves the determined position to the assistance data database 320. The location server 300 may use the assistance data database 320 to generate assistance data 322 and send to a mobile device 100.

Unlike the embodiments of FIG. 4, embodiments of FIG. 10 may include a broadcast position 220 and/or a transmit power level. In other words, access points may broadcast a beacon: (1) without either a broadcast position and transmit power level; (2) with a broadcast position 220 but without a transmit power level; (3) with a transmit power level bit without a broadcast position; or (4) with both a broadcast position 220 and a transmit power level. The resulting coverage report message 120 and crowd-sourced database 310 may similarly include neither, either or both the broadcast position 220 and/or the transmit power level.

If the transmit power level is included in the beacon, the mobile device 100 may compute and report the path loss from the difference of the transmit power level and the received power level (e.g., RSSI) rather than reporting the transmit power level. Equivalently, the mobile device 100 may convert the path loss to a distance (e.g., in meters) and report this distance rather than the path loss.

As described above, once the location server 300 receives the coverage report messages 120, the location server 300 reorganizes and sorts the coverage report messages 120 into a crowd-sourced database 310 sorted by access point. The location server 300 may calculate a crowd-sourced position 210 using this crowd-sourced database 310 as described above.

If an access point 200 broadcasts its transmit power level, the location server 300 converts any received ranging information (e.g., path loss, RSSI and RTT) into a distance. If an access point 200 does not broadcast its transmit power level but the transmit power level is known to the location server 300, the location server 300 converts the RSSI or the like into a distance. This distance and the GNSS location 110 of the mobile device 100 form a circle (or sphere) along which the access point 200 is located. A distance-GNSS location pair from a plurality of mobile devices 100 may be used to trilaterate the position of the access point 200.

In some embodiments, if only a first subset of mobile devices 100 report a path loss (or other ranging information) for a particular access point 200 while a second subset of mobile devices 100 do not report a path loss for the particular access point 200, only data from the first subset may be used by the location server 300 to determine a crowd-sourced position 210 of the access point 200. In other embodiments, an average or weighted average position is determined from both the first subset of mobile devices 100 reporting a path loss and the second subset of mobile devices 100 without a path loss report.

In some embodiments, only one distance threshold is used. This first distance threshold is used to distinguish an erroneous broadcast position 220 from an acceptable broadcast position 220. In some embodiments when considering an access point 200, a location server 300 compares a crowd-sourced position 210 to a broadcast position 220. If the two positions are too far apart (above the first distance threshold), the broadcast position 220 is considered erroneous and ignored. In some embodiments, if the two positions are closer (less than the first distance threshold), the location server 300 may consider the broadcast position 220 in determining the determined position 230 of the access point 200. For example, the location server 300 may set the determined position 230 to the broadcast position 220. Alternatively, the location server 300 may set the determined position 230 to the crowd-sourced position 210. In yet other embodiments, the location server 300 averages or weights both the crowd-sourced position 210 and the broadcast position 220 when determining the determined position 230 of the access point 200.

In some embodiments, a first distance threshold is used to distinguish an erroneous broadcast position 220 from a non-erroneous broadcast position 220, as described above, and a second distance threshold is used to distinguish a good and adjustable broadcast position 220 from a very good (nonadjustable) broadcast position 220. A good and adjustable broadcast position 220 is correctable and close but imperfect (within the first distance threshold but outside the second distance threshold) to the crowd-sourced position 210. In other words, a determined position 230 is an average or weighted combination of both the crowd-sourced position 210 and the broadcast position 220. On the other hand, a determined position 230 is not influenced by a crowd-sourced position 210. In other words, a determined position 230 is equal to the broadcast position 220.

In sum, a location server 300 pools and sorts by coverage report messages 120 from a plurality of mobile devices 100 to form the crowd-sourced database 310. The location server 300 then computes a crowd-sourced position 210 for an access point 200 from the crowd-sourced database 310. The location server 300 determines a determined position 230 of the access point 200 from comparing the distance between the crowd-sourced position 210 and the broadcast position 220. Depending on the distance, the location server 300 sets the determined position 230 to: (1) the crowd-sourced position 210 (distance>first distance threshold); (2) an average or weighted average of the crowd-sourced position 210 and the broadcast position 220 (first distance threshold>distance or first distance threshold>distance>second distance threshold); or (3) the broadcast position 220 (second distance threshold>distance). The location server 300 populates this determined position 230 in an assistance data database 320. The location server 300 takes and sends targeted portions of the assistance data database 320 to a mobile device 100 needing assistance data 322.

Figure 11:
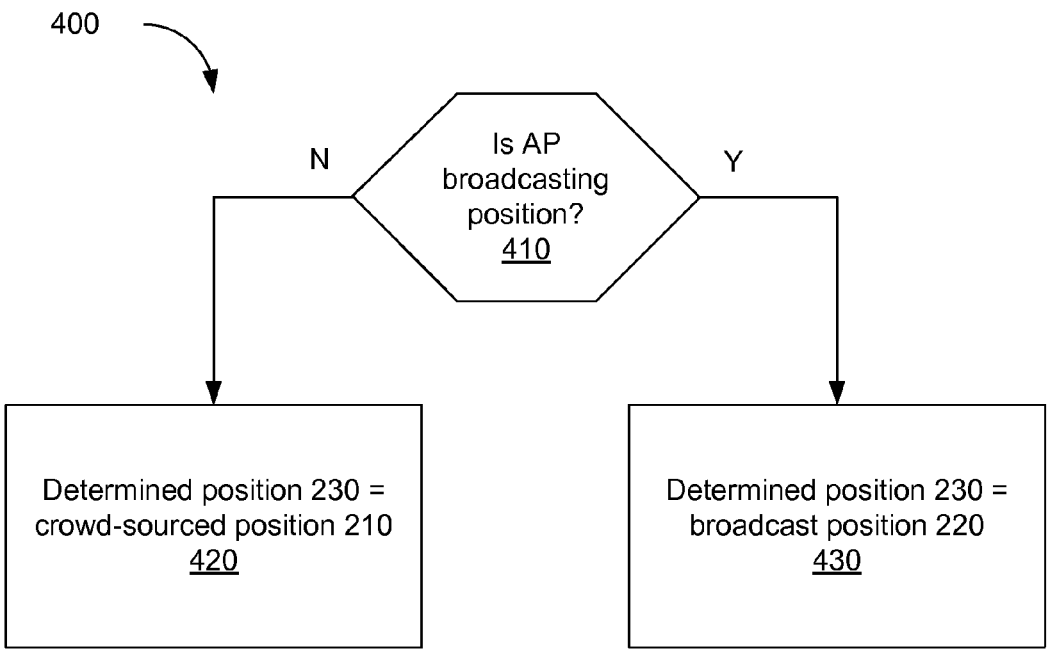
FIGS. 11-13 show methods of determining a position of an access point, in accordance with some embodiments of the present invention.
Figure 12:
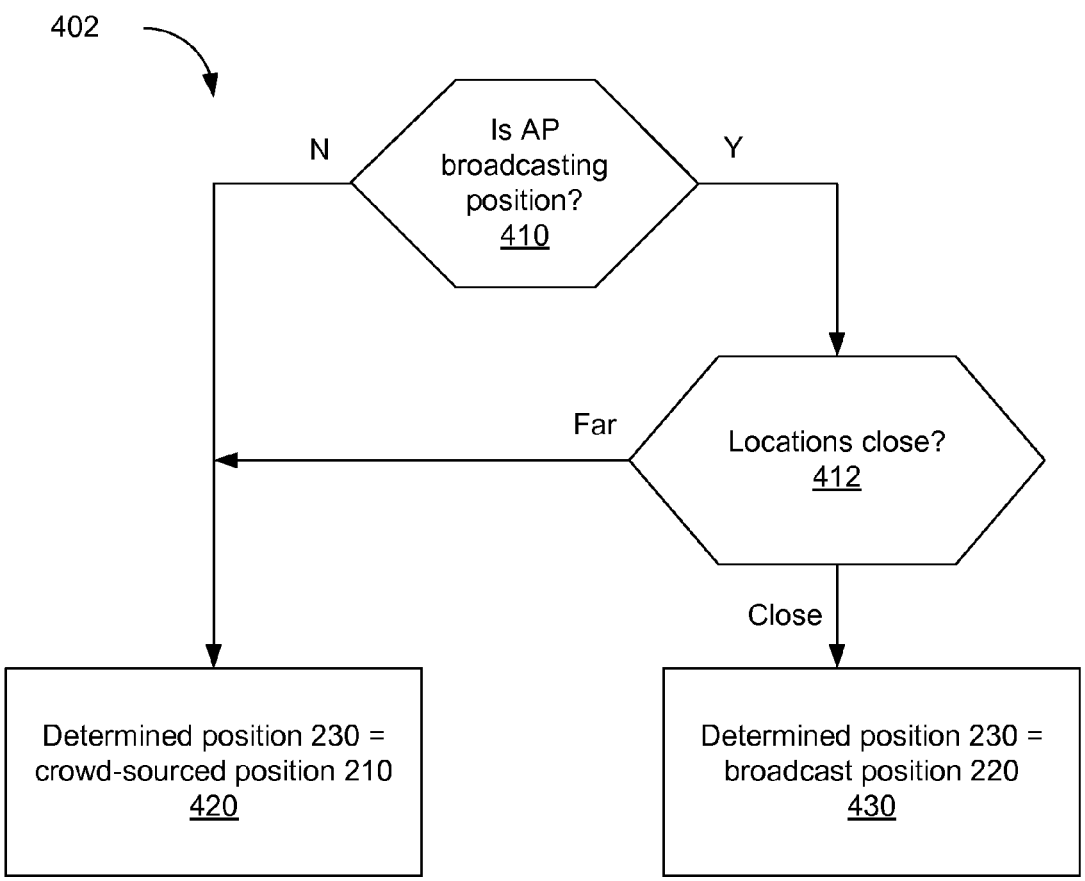
Figure 13:
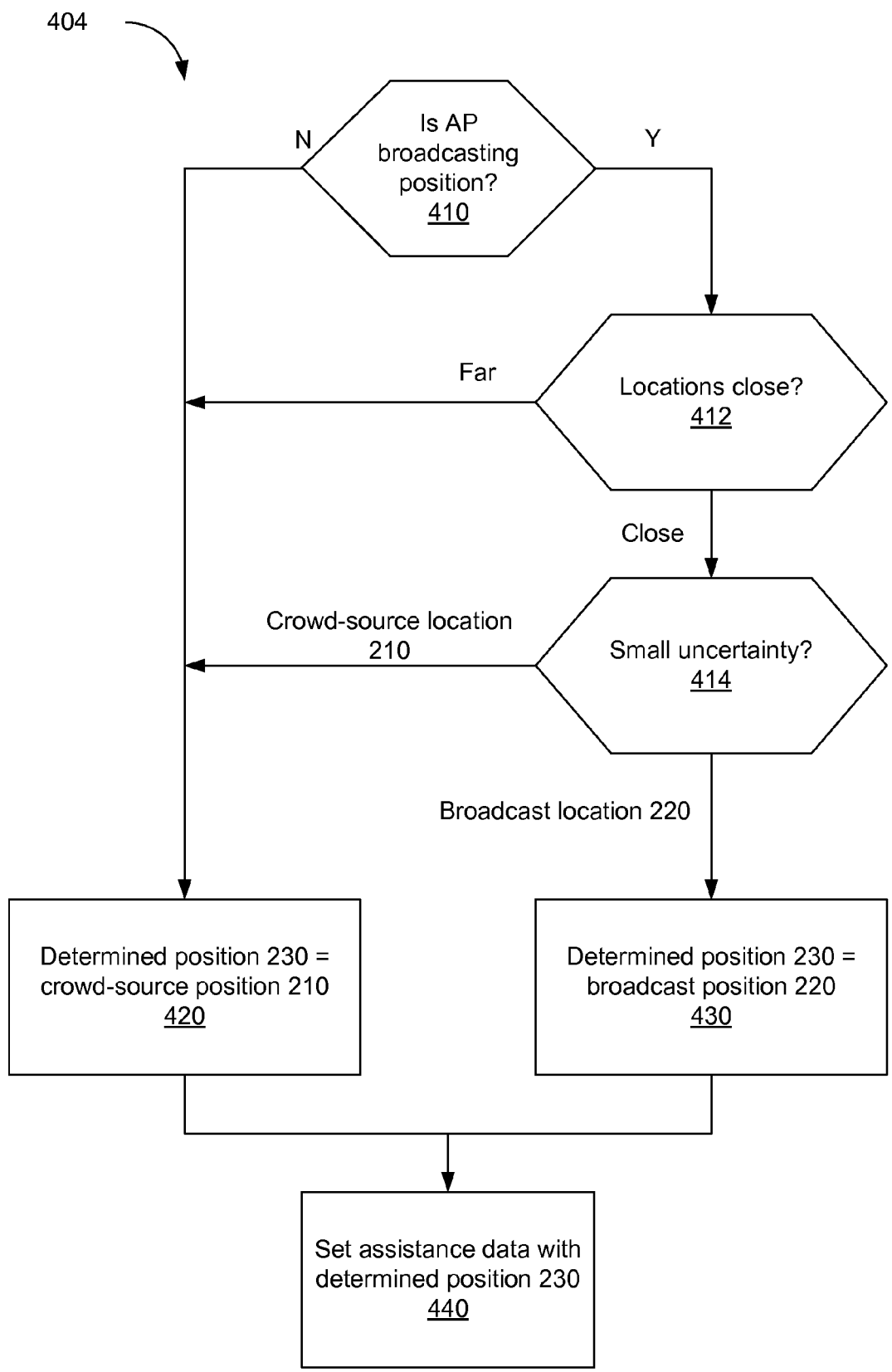

FIGS. 11-13 show methods of determining a position 230 of an access point 200, in accordance with some embodiments of the present invention. In FIG. 11, a method 400 begins at 410 with a location server 300 determining whether an access point 200 is broadcasting its position 220. At 420, if the access point 200 is not broadcasting its position, the location server 300 sets the determined position 230 to the crowd-sourced position 210. At 430, however, if the access point 200 is broadcasting its position 220, the location server 300 sets the determined position 230 to the broadcast position 220.

In FIG. 12, a method 402 at 410 again begins with determining whether an access point 200 is broadcasting its position 220. If the access point 200 is not broadcasting its position, method 402 continues to 420 described above. If the access point 200 is broadcasting its position 220, then method 402 continues to 412. At 412, the location server 300 computes a difference between the crowd-sourced position 210 and the broadcast position 220. If the distance is far (distance>first distance threshold), the method 402 continues to 420. If the distance is close (first distance threshold>distance), then then method 402 continues to 430 also described above.

In FIG. 13, a method 404 at 410 again begins with determining whether an access point 200 is broadcasting its position 220. If the access point 200 is not broadcasting its position, the method 404 continues to 420 described above. If the access point 200 is broadcasting its position 220, then then method 404 continues to 412 also described above. At 412, if the distance is far (distance>first distance threshold), the method 404 continues to 420. If the distance is close (first distance threshold>distance), then then method 402 continues to 414. At 414, the location server 300 determines if the uncertainty of the crowd-sourced position 210 is smaller than a second threshold. Alternatively at 414, the location server 300 determines if the uncertainty of the crowd-sourced position 210 is smaller than the uncertainty of the broadcast position 220. In either case, if the crowd-sourced uncertainty is smaller, the method 404 continues to 420 and if the crowd-sourced uncertainty is larger, the method 404 continues to 430, both described above. Finally, at 440, the location server 300 may set a position of an access point 200 in the assistance data database 320 to the determined position 230. When requested or needed, the location server 300 may send assistance data with the determined position 230 to a mobile device 100.

Figure 14:
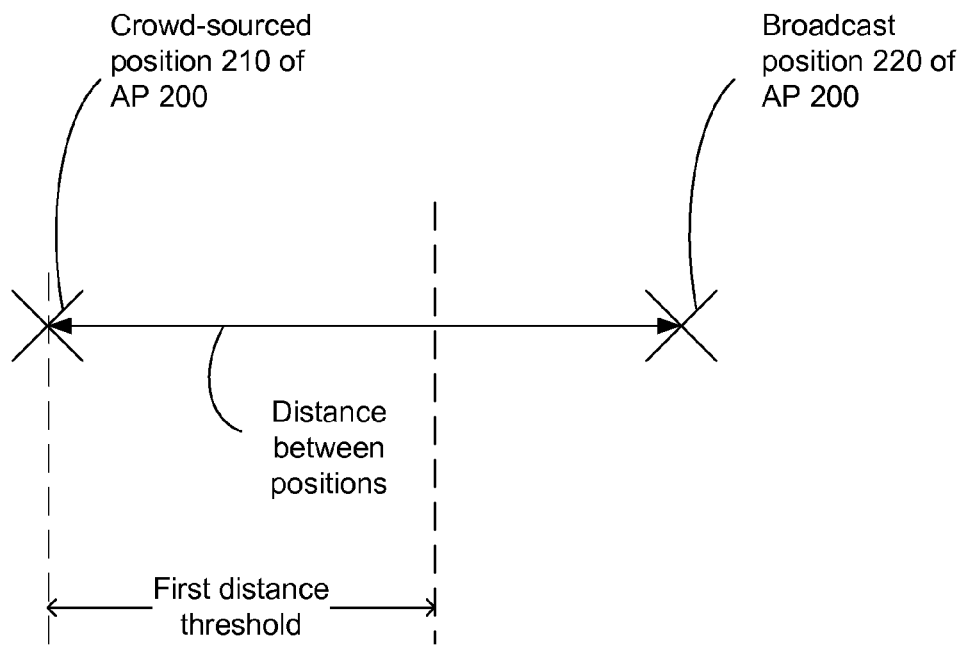
FIGS. 14-15 show relative positions, in accordance with some embodiments of the present invention.
Figure 15:
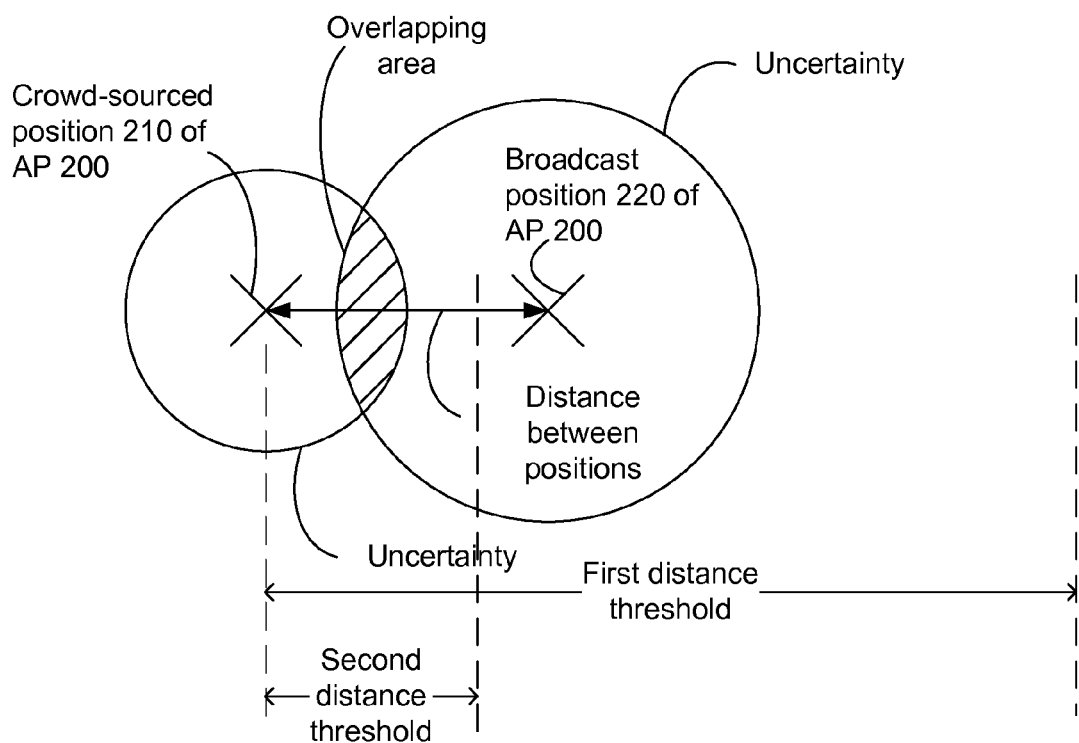

FIGS. 14-15 show relative positions, in accordance with some embodiments of the present invention. In FIG. 14, the location server 300 considers a distance between the crowd-sourced position 210 and the broadcast position 220 and compares this distance to a first distance threshold. When the distance is far (distance>first distance threshold) as shown, the location server 300 sets the determined position 230 to the crowd-sourced position 210 and the broadcast position 220 is ignored. When the distance is close (first distance threshold>distance), the location server 300 sets the determined position 230 a combination of the crowd-sourced position 210 and the broadcast position 220.

In FIG. 15, the location server 300 computes the determined position 230 using one of two different methods. In a first method, the location server 300 compares a distance between the crowd-sourced position 210 and the broadcast position 220. The location server 300 compares the distance to a first distance threshold and a second distance threshold. When the broadcast position 220 is greater than the first distance threshold (as shown in FIG. 14), the broadcast position 220 is ignored and the crowd-sourced position 210 is used as the determined position 230. When the broadcast position 220 is less than a first distance threshold and greater than a second distance threshold as shown, the broadcast position 220 is considered acceptable but adjustable. That is, the determined position 230 is set to a combination of the crowd-sourced position 210 and the broadcast position 220. When the broadcast position 220 is less than the second distance threshold, the broadcast position 220 is considered accurate enough and is not adjusted. That is, the determined position 230 is set to the broadcast position 220.

In a second method, the location server 300 considers overlapping uncertainties. When uncertainties overlap between the uncertainty of the crowd-sourced position 210 and the uncertainty of the broadcast position 220, the location server 300 sets the determined position 230 within this overlapping area. The location server 300 sets the determined position 230 at a point along a line between the crowd-sourced position 210 and the broadcast position 220. The points may be the midpoint of the line in overlapping area.

Alternatively, the point may be along the line but weighted by the uncertainties. Alternatively, the point may be at one end of the line within the overlapping area favoring the less uncertain position.

Figure 16:
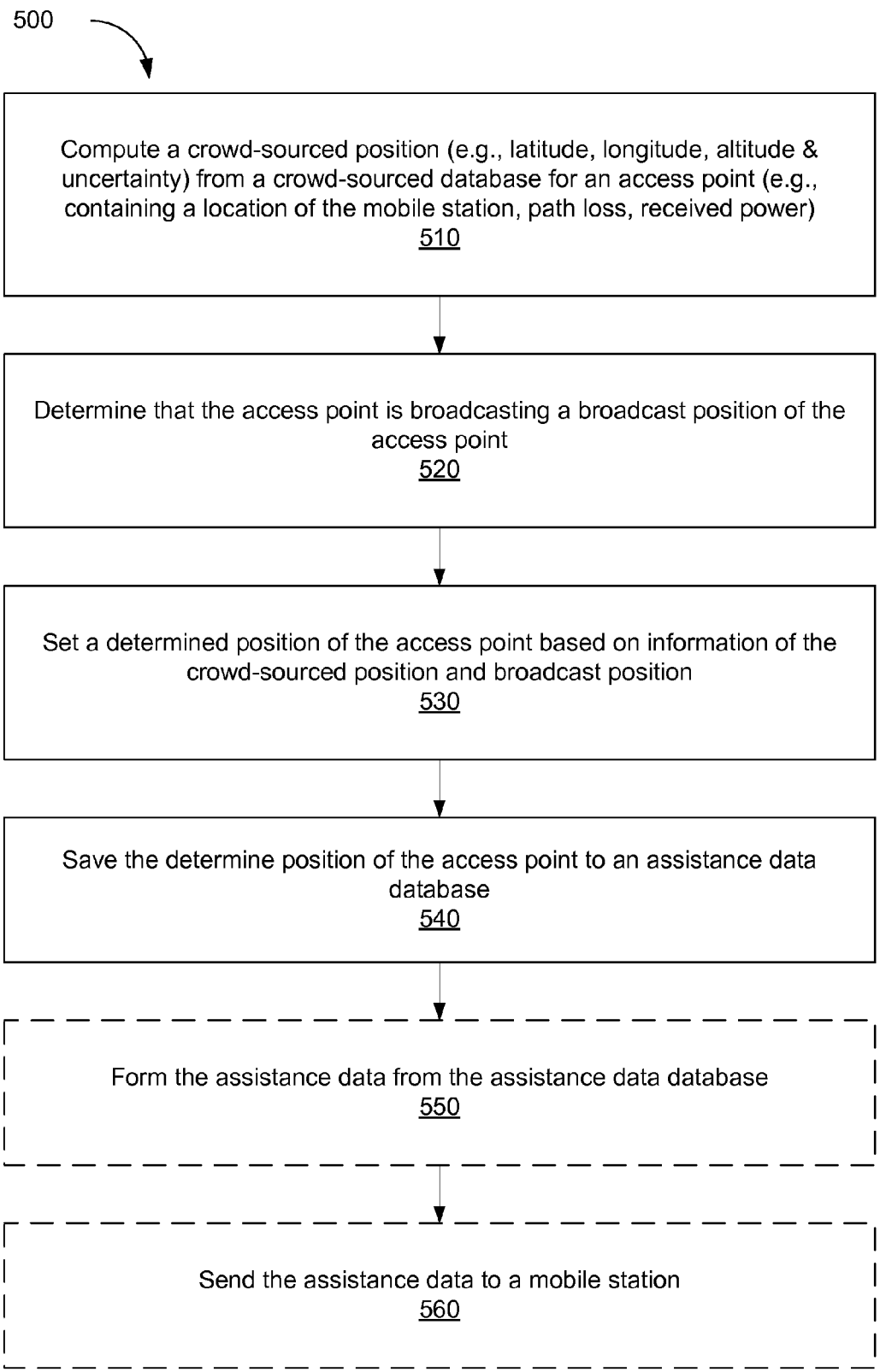
FIG. 16 shows a method in a location server, in accordance with some embodiments of the present invention.

FIG. 16 shows a method 500 in a location server 300, in accordance with some embodiments of the present invention. At 510, the location server 300 computes a crowd-sourced position 210 from a crowd-sourced database 310 for a particular access point 200. For example, the location server 300 may compute: (1) latitude and longitude; (2) latitude, longitude and altitude; (3) latitude, longitude and uncertainty; or (4) latitude, longitude, altitude and uncertainty.

The location server 300 may have earlier populated the crowd-sourced database 310 from coverage report messages 120 received from a plurality of mobile devices 100. A coverage report message 120 includes information about access points seen by a mobile device 100 as well as the GNSS location 110 of the mobile device 100. The coverage report message 120 may include a path loss between the access point 200 and the mobile device 100. Alternatively or in addition, the coverage report message 120 may include a received power (e.g., RSSI). The coverage report message 120 may include a broadcast position 220 of the access point 200.

At 520, the location server 300 determines that the access point 200 is broadcasting a broadcast position 220 of the access point 200. The crowd-sourced database 310 may indicate whether an access point 200 is broadcasting its position 220 by way of a flag or the broadcast position 220 itself, which may be associated with several mobile devices 100 or summarized once for the access point 200.

At 530, the location server 300 determines a position 230 of the access point 200 based on information of the crowd-sourced position 210 and the broadcast position 220. The determined position 230 may be: (1) the crowd-sourced position 210; (2) the broadcast position 220; or (3) a combination of the crowd-sourced position 210 and the broadcast position 220. The determined position 230 may be based on the distances between positions, an average or weighted average of positions, overlapping areas of uncertainty, size of an uncertainty, or sizes of uncertainties, for example, as compared to a first distance threshold or a first distance threshold and a second distance threshold.

At 540, the location server 300 saves the determined position 230 of the access point 200 to an assistance data database 320. At 550, the location server 300 may optional form the assistance data 322 from the assistance data database 320. At 560, the location server 300 may optionally send the assistance data 322 to a mobile device 100.

Figure 17:
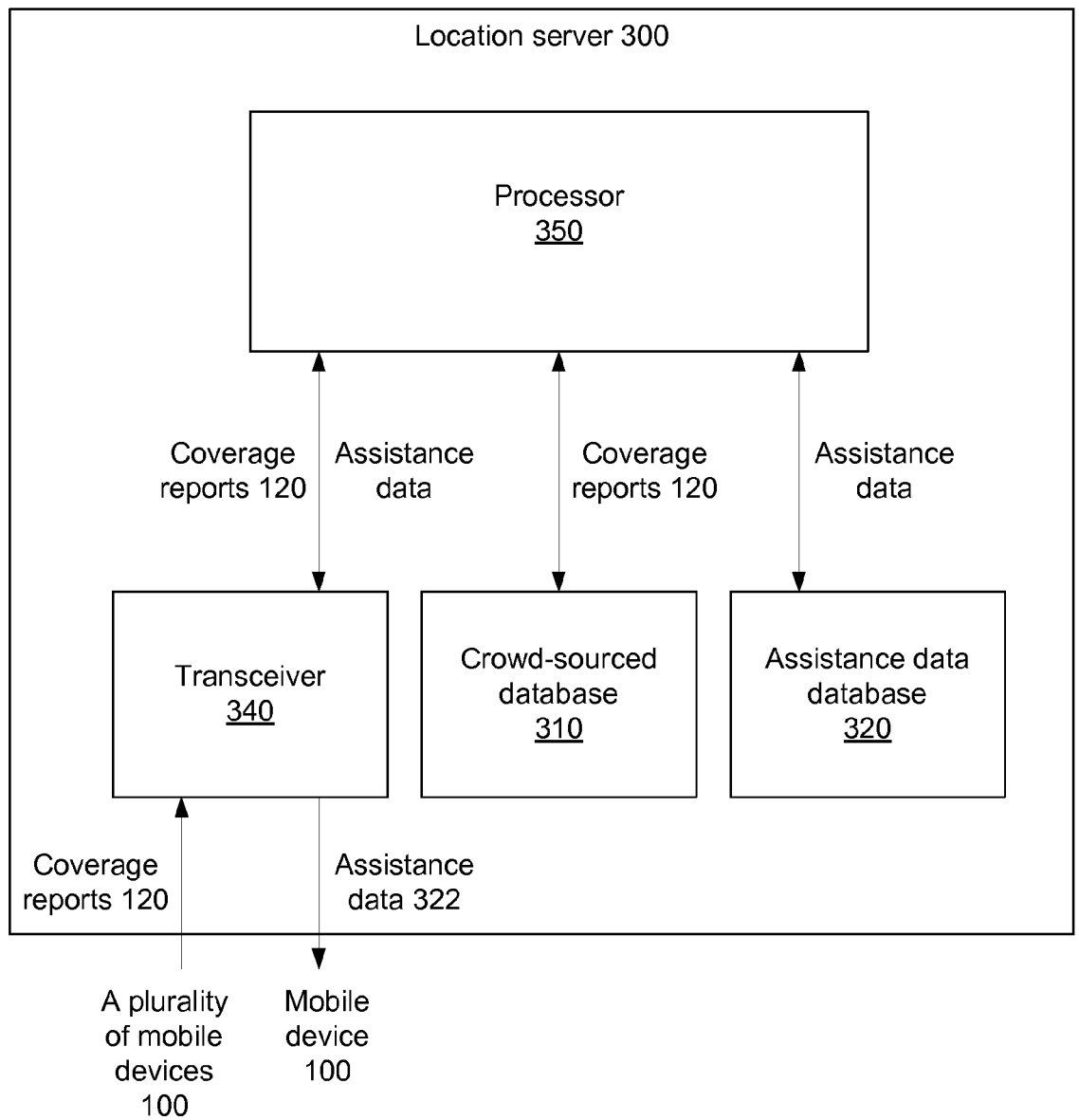
FIG. 17 shows elements of a location server, in accordance with some embodiments of the present invention.

FIG. 17 shows elements of a location server 300, in accordance with some embodiments of the present invention. The location server 300 includes a crowd-sourced database 310, an assistance data database 320, a transceiver 340 and a processor 350. The crowd-sourced database 310 is a repository for coverage report messages 120 from a plurality of mobile devices 100. The processor 350 computes a crowd-sourced position 210 for an individual access point 200 from the crowd-sourced database 310. The processor 350 also compares the crowd-sourced position 210 and a broadcast position 220 to determine a position 230 of the individual access point 200. The processor 350 saves the determined position 230 to the assistance data database 320. Later, the processor 350 accesses the assistance data database 320 to form assistance data 322 to send a specific mobile device 100. The transceiver 340 receives coverage report messages 120 from a plurality of mobile devices 100, which are forwarded to the processor 350. The transceiver 340 transmits assistance data 322 from the processor 350 to an individual mobile device 100.

Figure 18:
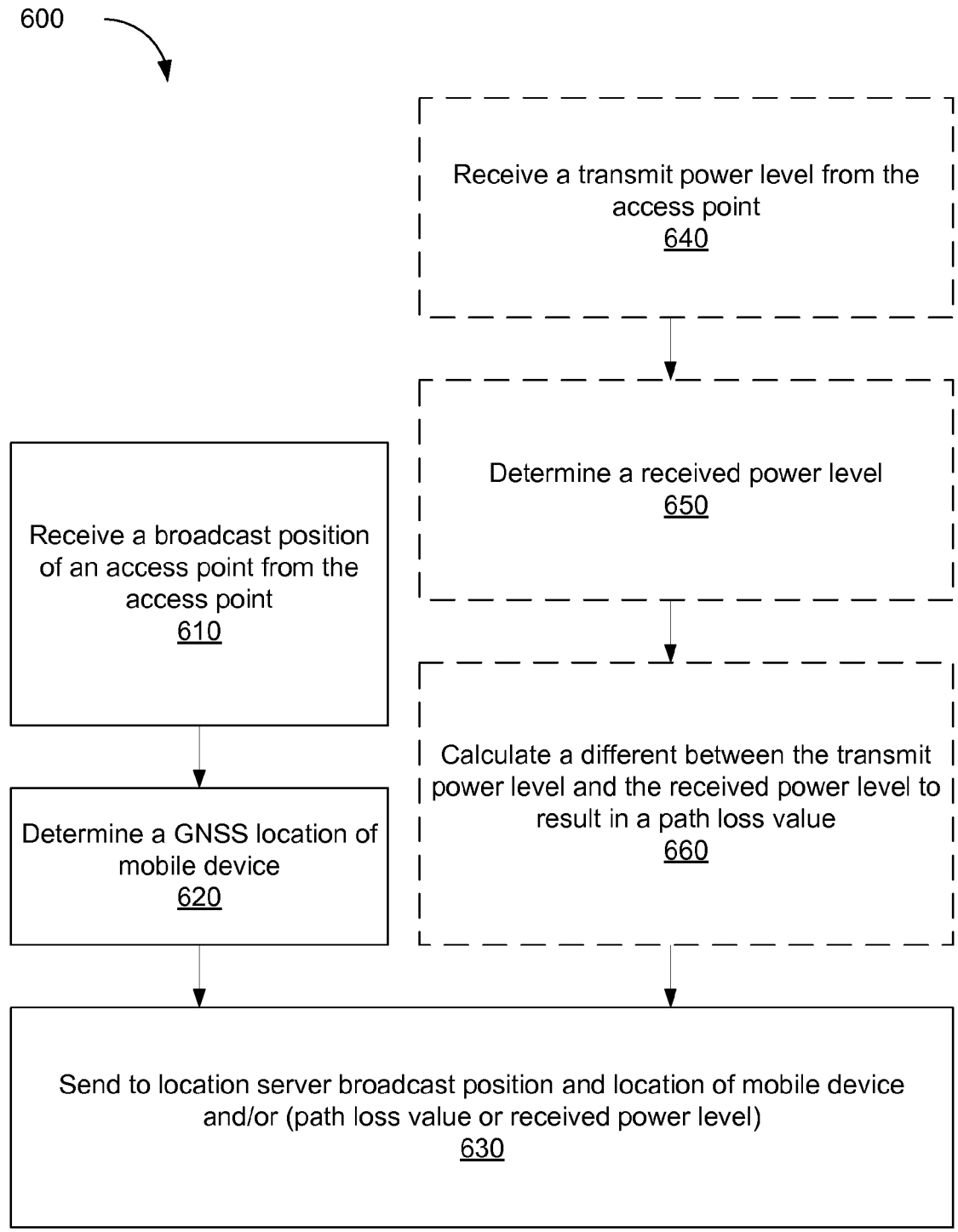
FIG. 18 shows a method in a mobile device, in accordance with some embodiments of the present invention.

FIG. 18 shows a method 600 in a mobile device 100, in accordance with some embodiments of the present invention. At 610, the mobile device 100 receives a broadcast position 220 of an access point 200 from the access point 200 itself. At 620, the mobile device 100 determines a location of the mobile device. Steps 610 and 620 may be performed sequentially, serially, or partially or fully overlapping.

Shown with dotting boxes, the mobile device 100 may optionally receive and process a transmit power level. At 640, the mobile device 100 receives a transmit power level from the access point. At 650, the mobile device 100 determines a received power level. At 660, the mobile device 100 calculates a different between the transmit power level and the received power level to result in a path loss value.

Whether or not a transmit power level was received and processed, at 630, the mobile device 100 sends to the location server 300 the broadcast position 220 and the GNSS location 110 of the mobile device 100 in a coverage report message 120. If available, the mobile device 100 also sends the path loss value and/or the received power level to the location server 300 in the coverage report message 120.

Figure 19:
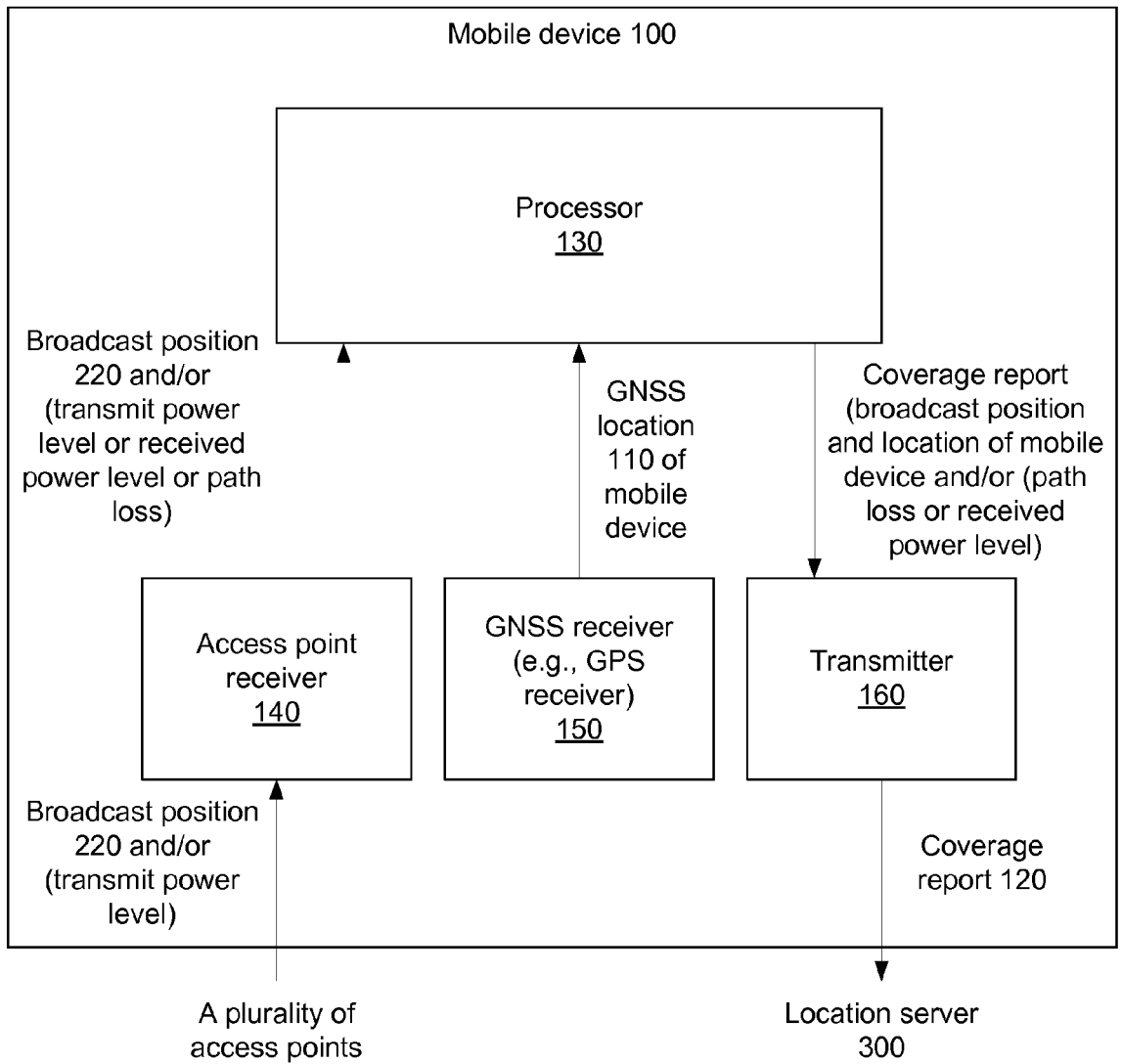
FIG. 19 shows elements of a mobile device, in accordance with some embodiments of the present invention.

FIG. 19 shows elements of a mobile device 100, in accordance with some embodiments of the present invention. The mobile device 100 includes a processor 130, an access point receiver 140, a GNSS receiver and a transmitter 160. The access point receiver 140 may measure ranging information such as RTT and/or RSSI from each of a plurality of access points 200. The access point receiver 140 receives broadcast information, such as a broadcast position 220 and/or a transmit power level from one or more of the plurality of access points 200. The access point receiver 140 forwards this information to a processor 130. The processor 130 also receives a GNSS location 110 of the mobile device 100 from the GNSS receiver. The processor 130 generates and sends coverage report messages 120 via the transmitter 160 to a location server 300. A coverage report message 120 contains the GNSS location 110 of the mobile device 100 as well as the received broadcast position 220, path loss and/or received power level. The access point receiver 140 and the transmitter 160 may be combined into one transceiver.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a location server for preparing assistance data, the method comprising:
   computing a crowd-sourced position from a crowd-sourced database for an access point, wherein the crowd-sourced database for the access point comprises ranging information for the access point measured by a plurality of mobile devices and a location of each mobile device in the plurality of mobile devices, wherein the crowd-sourced position is computed based on the ranging information measured by the plurality of mobile devices and the location of each mobile device;
   determining that the access point is broadcasting a broadcast position of the access point;
   setting a position of the access point based on information of the crowd-sourced position computed by the location server and the broadcast position broadcasted by the access point;
   saving the position of the access point to an assistance data database.

2. The method of claim 1, wherein the crowd-sourced position comprises a latitude, longitude and uncertainty.

3. The method of claim 1, wherein the ranging information measured by the plurality of mobile devices comprises, for each mobile device from the plurality of mobile devices, a path loss between the access point and the mobile device.

4. The method of claim 1, wherein the ranging information measured by the plurality of mobile devices comprises, for each mobile device from the plurality of mobile devices, a received power or a round trip time measurement.

5. The method of claim 1, wherein the crowd-sourced database for the access point further comprises the broadcast position from the access point and wherein the crowd-sourced position is determined based on the broadcast position, the location of each mobile device and the ranging information or the path loss value.

6. The method of claim 1, wherein setting the position of the access point based on information of the crowd-sourced position computed by the location server and the broadcast position broadcasted by the access point comprises:
   determining an overlap area between an uncertainty area of the crowd-sourced position and an uncertainty area of the broadcast position; and
   setting the position of the access point within the overlap area.

7. The method of claim 1, wherein setting the position of the access point based on information of the crowd-sourced position computed by the location server and the broadcast position broadcasted by the access point comprises:
   determining an overlap area between an uncertainty area of the crowd-sourced position and an uncertainty area of the broadcast position; and
   setting the position of the access point to one of the crowd-sourced position and the broadcast position based on a lower uncertainty.

8. The method of claim 1, wherein setting the position of the access point based on information of the crowd-sourced position computed by the location server and the broadcast position broadcasted by the access point comprises:
   determining no overlap area exists between an uncertainty area of the crowd-sourced position and an uncertainty area of the broadcast position; and
   setting the position of the access point to the crowd-sourced position.

9. The method of claim 1, wherein setting the position of the access point based on information of the crowd-sourced position computed by the location server and the broadcast position broadcasted by the access point comprises:
   calculating a difference between the crowd-sourced position and the broadcast position;
   comparing the difference to a threshold to set a position; and
   setting the position of the access point based on the comparison.

10. The method of claim 9, wherein setting the position of the access point based on the comparison comprises:
    determining the difference between the crowd-sourced position and the broadcast position is within the threshold; and
    selecting the position, between the crowd-sourced position and the broadcast position, having a lower uncertainty.

11. The method of claim 1, further comprising forming the assistance data from the assistance data database.

12. The method of claim 11, further comprising sending the assistance data to a mobile device.

13. A location server for preparing assistance data, the location server comprising:
    a crowd-sourced database reports for a plurality of access points, wherein the crowd-sourced database for an access point comprises ranging information for the access point measured by a plurality of mobile devices and a location of each mobile device in the plurality of mobile devices;

an assistance data database containing a position of each of the plurality of access points; and a processor coupled to the crowd-sourced database and the assistance data database, and configured to:

compute a crowd-sourced position from the crowd-sourced database for each access point, wherein the crowd-sourced position is computed based on the ranging information measured by the plurality of mobile devices and the location of each mobile device;

determine that the access point is broadcasting a broadcast position of the access point;

set the position of the access point based on information of the crowd-sourced position computed by the location server and the broadcast position broadcasted by the access point;

save the position of the access point to the assistance data database.

14. The location server of claim 13, further comprising a transceiver, wherein the transceiver is configured to couple to a plurality of mobile devices to receive a coverage report.

15. The location server of claim 13, wherein the processor is further configured to form the assistance data from the assistance data database.

16. The location server of claim 15, wherein the processor is further configured to send the assistance data to a mobile device.

17. A location server for preparing assistance data, the location server comprising:

means for computing a crowd-sourced position from a crowd-sourced database for an access point, wherein the crowd-sourced database for the access point comprises ranging information for the access point measured by a plurality of mobile devices and a location of each mobile device in the plurality of mobile devices, wherein the crowd-sourced position is computed based on the ranging information measured by the plurality of mobile devices and the location of each mobile device;

means for determining that the access point is broadcasting a broadcast position of the access point;

means for setting a position of the access point based on information of the crowd-sourced position computed by the location server and the broadcast position broadcasted by the access point;

means for saving the position of the access point to an assistance data database.

18. The location server of claim 17, wherein the means for setting the position of the access point based on information of the crowd-sourced position computed by the location server and the broadcast position broadcasted by the access point comprises:

means for determining an overlap area between an uncertainty area of the crowd-sourced position and an uncertainty area of the broadcast position; and means for setting the position of the access point within the overlap area.

19. The location server of claim 17, wherein means for setting the position of the access point based on information of the crowd-sourced position computed by the location server and the broadcast position broadcasted by the access point comprises:

means for determining an overlap area between an uncertainty area of the crowd-sourced position and an uncertainty area of the broadcast position; and means for setting the position of the access point to one of the crowd-sourced position and the broadcast position based on a lower uncertainty.

20. The location server of claim 17, wherein means for setting the position of the access point based on information of the crowd-sourced position computed by the location server and the broadcast position broadcasted by the access point comprises:

means for determining no overlap area exists between an uncertainty area of the crowd-sourced position and an uncertainty area of the broadcast position; and means for setting the position of the access point to the crowd-sourced position.

21. The location server of claim 17, wherein means for setting the position of the access point based on information of the crowd-sourced position computed by the location server and the broadcast position broadcasted by the access point comprises:

means for calculating a difference between the crowd-sourced position and the broadcast position;

means for comparing the difference to a threshold to set a position; and means for setting the position of the access point based on the comparison.

22. A non-transitory computer-readable storage medium for preparing assistance data in a location server, the non-transitory computer-readable storage medium including program code stored thereon, comprising program code to:

compute a crowd-sourced position from a crowd-sourced database for an access point, wherein the crowd-sourced database for the access point comprises ranging information for the access point measured by a plurality of mobile devices and a location of each mobile device in the plurality of mobile devices, wherein the crowd-sourced position is computed based on the ranging information measured by the plurality of mobile devices and the location of each mobile device;

determine that the access point is broadcasting a broadcast position of the access point;

set a position of the access point based on the crowd-sourced position computed by the location server and the broadcast position broadcasted by the access point;

save the position of the access point to an assistance data database.

23. The non-transitory computer-readable storage medium of claim 22, wherein the program code to set the position of the access point based on the crowd-sourced position computed by the location server and the broadcast position broadcasted by the access point comprises program code to set the position to the crowd-sourced position.

24. The non-transitory computer-readable storage medium of claim 22, wherein the program code to set the position of the access point based on the crowd-sourced position computed by the location server and the broadcast position broadcasted by the access point comprises program code to set the position to the broadcast position.

* * * * *